United States Patent
Mandadi et al.

(10) Patent No.: US 12,099,923 B1
(45) Date of Patent: Sep. 24, 2024

(54) DETERMINING APPLICATION PERFORMANCE CORRELATIONS ACROSS ISOLATED NETWORK ENVIRONMENTS

(71) Applicant: Amazon Technologies, Inc., Reno, NV (US)

(72) Inventors: Vijay Dheeraj Reddy Mandadi, Fremont, CA (US); Raviprasad V Mummidi, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 916 days.

(21) Appl. No.: 16/685,188

(22) Filed: Nov. 15, 2019

(51) Int. Cl.
*G06N 3/08* (2023.01)
*G06F 9/455* (2018.01)
*G06N 3/04* (2023.01)

(52) U.S. Cl.
CPC ........... *G06N 3/08* (2013.01); *G06F 9/45533* (2013.01); *G06N 3/04* (2013.01)

(58) Field of Classification Search
CPC ......... G06F 9/45533; G06N 3/08; G06N 3/04
See application file for complete search history.

(56) References Cited

U.S. PATENT DOCUMENTS

| | | | | |
|---|---|---|---|---|
| 7,490,323 B2 * | 2/2009 | D'Alo | ................. | G06F 11/3466 709/224 |
| 7,577,722 B1 * | 8/2009 | Khandekar | ......... | G06F 9/45558 718/1 |
| 8,145,760 B2 * | 3/2012 | Dinda | ................. | H04L 67/1008 718/100 |
| 9,111,219 B1 * | 8/2015 | Mohla | ..................... | G06N 5/04 |
| 9,225,772 B2 * | 12/2015 | Lui | ......................... | H04L 47/70 |
| 9,424,062 B1 * | 8/2016 | Mummidi | ........... | G06F 9/45558 |
| 9,588,792 B2 * | 3/2017 | Krishna | .............. | H04L 63/1416 |
| 10,027,530 B2 * | 7/2018 | Mahkonen | .......... | H04L 43/0864 |
| 10,120,714 B1 * | 11/2018 | Cabrera | ................ | G06F 9/5011 |
| 10,146,607 B2 * | 12/2018 | Mukerji | .................. | G06F 11/0709 |
| 10,536,350 B2 * | 1/2020 | Myneni | ................... | H04L 41/22 |
| 10,810,050 B2 * | 10/2020 | Pabari | ..................... | H04L 41/40 |
| 11,106,785 B2 * | 8/2021 | Antony | .............. | H04L 63/0209 |
| 11,140,030 B2 * | 10/2021 | Bursell | ................... | G06F 21/53 |
| 11,140,045 B2 * | 10/2021 | Fong | ..................... | G06F 9/5072 |
| 2009/0106256 A1 * | 4/2009 | Safari | ..................... | H04L 41/50 |
| 2009/0265707 A1 * | 10/2009 | Goodman | ............. | G06F 9/5027 718/1 |
| 2010/0174811 A1 * | 7/2010 | Musiri | ................ | H04L 63/0272 709/223 |
| 2013/0167123 A1 * | 6/2013 | Dura | ................... | G06F 11/3624 717/127 |

(Continued)

*Primary Examiner* — Douglas M Slachta
(74) *Attorney, Agent, or Firm* — Hogan Lovells US LLP

(57) ABSTRACT

Applications may execute using resources from multiple environments or ecosystems, such as may include virtual resources from a virtual resource environment hosted on physical resources of a cloud provider environment. An event manager in the cloud provider environment can obtain virtualization performance data from the virtual resource environment, as well as performance data from within the cloud provider environment. This data can be fed to an inference engine that can correlate information from the separate environments, and these correlations can be used to generate recommendations for performance adjustments in either the physical or virtual resource environment.

20 Claims, 6 Drawing Sheets

(56) References Cited

U.S. PATENT DOCUMENTS

| | | | | |
|---|---|---|---|---|
| 2013/0167128 A1* | 6/2013 | Narayana | G06F 8/41 | 717/143 |
| 2013/0326032 A1* | 12/2013 | Duarte | H04L 41/0803 | 709/221 |
| 2014/0025816 A1* | 1/2014 | Otani | G06F 9/5072 | 709/225 |
| 2014/0344459 A1* | 11/2014 | Kludy | H04L 47/70 | 709/226 |
| 2014/0365662 A1* | 12/2014 | Dave | H04L 41/0893 | 709/226 |
| 2015/0334039 A1* | 11/2015 | Crowell | H04L 12/6418 | 709/226 |
| 2015/0378765 A1* | 12/2015 | Singh | G06F 9/45558 | 718/1 |
| 2016/0164797 A1* | 6/2016 | Reque | G06F 9/45533 | 718/1 |
| 2016/0378545 A1* | 12/2016 | Ho | G06F 9/4843 | 718/107 |
| 2016/0380832 A1* | 12/2016 | Purushotham | H04L 41/40 | 709/226 |
| 2017/0317949 A1* | 11/2017 | Aharonov | G06F 9/5044 | |
| 2018/0095997 A1* | 4/2018 | Beveridge | H04L 47/70 | |
| 2018/0232517 A1* | 8/2018 | Roth | G06F 21/53 | |
| 2018/0359164 A1* | 12/2018 | Frankel | H04L 43/08 | |
| 2019/0034233 A1* | 1/2019 | Cobbold | G06F 9/50 | |
| 2019/0034236 A1* | 1/2019 | Cheng | G06F 9/5027 | |
| 2019/0034311 A1* | 1/2019 | Cheng | G06F 9/44505 | |
| 2019/0163538 A1* | 5/2019 | Klein | G06F 9/45558 | |
| 2019/0278928 A1* | 9/2019 | Rungta | G06F 9/5077 | |
| 2019/0294477 A1* | 9/2019 | Koppes | G06F 9/5072 | |
| 2019/0324741 A1* | 10/2019 | Paskalev | G06F 9/45558 | |
| 2019/0340095 A1* | 11/2019 | Faibish | G06F 11/302 | |
| 2020/0073739 A1* | 3/2020 | Rungta | G06F 8/60 | |
| 2020/0379818 A1* | 12/2020 | Kiraly | G06F 9/5072 | |
| 2021/0294656 A1* | 9/2021 | Tomic | G06F 9/5005 | |

* cited by examiner

DETERMINING APPLICATION PERFORMANCE CORRELATIONS ACROSS ISOLATED NETWORK ENVIRONMENTS

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. The resources can be physical resources or virtual resources provided through virtualization.

BRIEF DESCRIPTION OF THE DRAWINGS

Various embodiments in accordance with the present disclosure will be described with reference to the drawings, in which.

DETAILED DESCRIPTION

Figure 1:
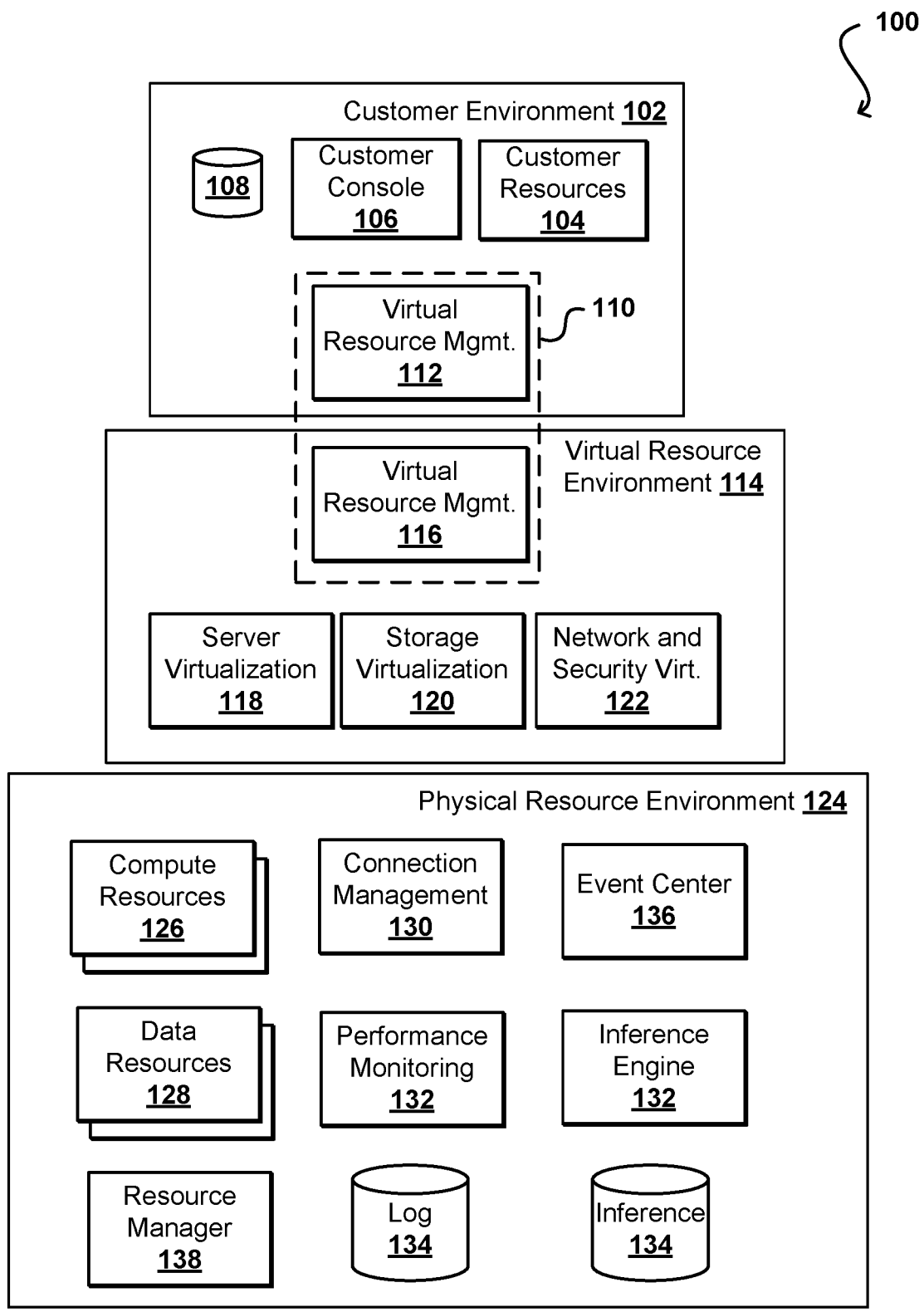
FIG. 1 illustrates an example system for providing virtual resources to a customer that can be utilized in accordance with various embodiments.

As described above, customers of a cloud computing environment may use virtual resources that run on top of a physical network of computing hosts. In some instances, however, the physical resources used to host these virtual resources may be owned and operated by a different entity than the provider of the virtual resources, or may be provided from a different logical environment. For example, a partner of a cloud provider may acquire a number of physical hosts in the cloud provider network for exclusive use by the partner and their customers (e.g., dedicated hosts). The partner may then run their own virtualization solution on these dedicated hosts, and can vend the resulting virtualized resources to their own customers. However, the cloud provider may not grant access to information about the underlying physical host network to the partner, and likewise the virtualized portion of the cloud provider network that is dedicated to the partner may not be accessible to the cloud provider. These networks may be logically isolated from one another to enforce privacy and security boundaries, and as a result diagnostic information and/or performance metrics relating to resources in one of the isolated networks may not be able to cross into the other isolated network. As a result, a customer of the provider network's partner having an application running on the partner's virtual resources can then have difficulty debugging or troubleshooting the application, as it relies on resources across multiple environment boundaries.

The aforementioned challenges, among others, are addressed in some embodiments by the disclosed application advisor tools which are able to provide performance insights across multiple logically isolated network environments. In particular, various embodiments provide for the correlation of events across environment boundaries, as well as recommendations or remediation to be performed in those environments. This can include, for example, events in a virtual resource environment, where those virtual resources are hosted on physical resources in a physical resource environment associated with, and managed by, different entities, such as different resource providers or service providers. The event data can also include data related to physical resources in the physical resource environment or resources of a customer, among other such options. The correlations can be used to determine actions to be taken in any of those environments in order to improve performance of the application.

Although examples of the present disclosure are presented in the context of a managed virtualization service that runs on cloud infrastructure, but is logically isolated from the underlying infrastructure due to being operated by a partner of the cloud provider, it will be appreciated that the disclosed application advisor tools can be used in other contexts to provide performance insights into applications that span multiple logically isolated network environments. For example, the cloud provider may have managed service offerings (such as storage offerings, database offerings, serverless computing offerings, software development offerings, machine learning offerings, etc.) that run in their own logically isolated networks within the cloud provider environment. When customer applications depend on such managed service offerings, the disclosed application advisor can help with any debugging insights that relate to performance issues within the managed service offerings.

Various other applications, processes, and uses are presented below with respect to the various embodiments.

FIG. 1 illustrates an example configuration 100 that can be utilized in accordance with various embodiments. This example configuration includes three different environments, including a customer environment 102, a virtual resource environment 114, and a physical resource environment 124. There may be a different number or selection of environments in other embodiments. The environments may be provided with separate or overlapping resources at similar or different geographic or logical locations as well in various embodiments. Further, in different embodiments these environments can be provided and/or managed by various entities, individually or in any combination. In one example, a cloud provider environment 124 has a substrate and overlay network and is provided by and managed by the cloud provider, virtual resource environment 114 is an additional overlay network on top of the overlay network of the cloud provider environment, where the virtual resource environment 114 is managed by a second entity (such as a partner of the cloud provider that makes use of the cloud provider infrastructure to deliver their own virtualization solutions), and the customer environment 102 runs at least partially within the virtual resource environment 114 but is managed by a customer of the partner. In some embodiments, more than two overlays may be utilized in a stack, where those overlays may each by provided or managed by different entities, such as different companies or service providers, etc.

For example, the cloud provider environment 124 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network), for example by way of a transit center that may be colocated at other network provider facilities (e.g., Internet service providers, telecommunications providers) and securely connected (e.g. via a VPN or direct connection) to the availability zones. A region may operate two or more transit centers for redundancy.

The cloud provider network can include a physical network (e.g., sheet metal boxes, cables, rack hardware) referred to as the substrate. The substrate can be considered as a network fabric containing the physical hardware that runs the services of the provider network. The substrate may be logically isolated from the rest of the cloud provider network, for example it may not be possible to route from a substrate network address to an address in a production network that runs services of the cloud provider, or to a customer network that hosts customer resources. Logical isolation is a configuration that prevents sets of computing resources, which share a common physical network infrastructure, from being able to communicate with each other. For example, two logically-isolated devices can be physically connected to the same network, but to enforce the logical isolation a protocol or device can be used to prevent them from communicating with one another. Logical isolation can apply to sets of physical devices and/or virtualized computing resources.

The cloud provider network can also include an overlay network of virtualized computing resources that run on the substrate. As such, network packets can be routed along the substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

Some embodiments of the virtual resource environment 114 can be considered as an additional overlay network that is overlaid onto the cloud provider's overlay network (e.g., creating a dual overlay). This additional overlay network may be logically isolated from the remainder of the cloud provider network, for example to provide security and/or privacy for both the partner's virtualized network and the cloud network infrastructure. In other embodiments, the partner of the cloud provider may acquire bare metal servers in the cloud provider network, and the virtual resource environment 114 may be an alternative overlay network to the cloud provider's overlay network.

The customer environment 102 includes at least one virtual resource that runs within the virtual resource environment 114 on top of the cloud provider environment 124. In at least one embodiment, the customer environment 102 can may be a hybrid cloud environment, including the virtual resource(s) that run within the virtual resource environment 114 as well as including various additional resources, including hardware and software, that may be located at one or more customer sites (e.g., on premises of the customer) and under control of the customer or another such entity. As discussed elsewhere herein, a customer may include a user or entity having an account with a provider of at least one of the virtual resource environment 114 or the physical resource environment 124. The customer environment can include a number of customer resources 104, as may include servers, databases, network infrastructure, and the like, for purposes such as hosting or executing applications, or accessing applications hosted in one of the external environments. The customer environment 102 can include a customer console 106 that enables a user to access information about applications hosted in, for example, the virtual resource environment 114. Data corresponding to the application or external environments can be stored locally to one or more data repositories 108.

In at least one embodiment, a customer may not wish to provide and manage all necessary resources within the customer environment 102. Accordingly, a customer might develop a relationship with an external provider to obtain additional resource capacity that will be at least partially maintained or managed by that external entity. In one embodiment, the customer may enter into a relationship, or establish an account, with a provider of a virtual resource environment 114. In such a relationship, there can be virtual resources, such as virtual machines or virtual servers, executing in the virtual resource environment 114 on behalf of the customer. One such offering is the VMware Cloud (VMC) offered by VMware, Inc. In the case of VMC, a customer is able to utilize resources of the virtual resource environment 114 to function as, for example, a virtual data center. In one embodiment, this can be a VMware Software-Defined Data Center (SDDC). In a SDDC implementation, virtualization functionality such as abstraction, pooling, and automation can be provided through virtual resource management software 114, which can be shared between the virtual resource environment 114 and the customer environment 102 through a shared management service 110. In one embodiment, this shared service 110 is VMware vCenter, which can be operated in a hybrid linked mode between the two environments. A vCenter implementation can utilize vCenter Server software to provide a centralized location for managing the vSphere environment, including virtual infrastructure contained therein.

In at least one embodiment, a virtual resource environment 114 can include components that provide for server virtualization 118, storage virtualization 120, and network and security virtualization 122, among other such options. For a VMware-based implementation, these offerings can correspond to vSphere, vSAN, and NSX, respectively. A customer can use their VMware account and software to access virtual resources in the virtual resource environment 114 for use with, or in addition to, any customer resources 104 in the customer environment. In some embodiments, a customer might utilize virtualization software across these environments, such as where VMC would manage virtual resources in the virtual resource environment 114 as well as at least some resources in the customer environment 102, or at least on premises at a customer location.

Virtual resources provided through the virtual resource environment 114 will be hosted or provided using physical resources of a party or entity other than the customer or provider of the virtual resource environment 114. Resources of a physical resource environment 124 may be used to host the virtual resources of the virtual resource environment 114. The customer or virtual resource environment provider, or both, may have a relationship or account with a provider of the physical resource environment. Through this account, physical resources (e.g., compute resources 126 such as servers or data resources 128 such as physical data storage) of the physical resource environment can be used to host the virtual resources in the virtual resource environment and/or the customer environment that provide virtual resources on behalf of the customer. In at least one embodiment, such offering can take the form of VMware Cloud on AWS (Amazon Web Services). AWS, a subsidiary of Amazon.com, Inc., provides on-demand cloud computing services, including offerings such as the Amazon Elastic Compute Cloud (EC2) and Amazon Simple Storage Service (S3). An AWS-based implementation may also include offerings such as Amazon Relational Database Service (RDS) or DynamoDB for hosting data, Amazon Redshift for data warehousing, AWS Direct Connect for managing network communications with AWS resources, and the like. Using an implementation as in FIG. 1, then, a customer can obtain virtual resources through a virtual resource environment 114 that are hosted on resources of a physical resource environment 124. In the case of an SDDC, this can involve one or more SDDCs hosted on EC2 instances, where AWS would manage the physical resources, including networking and support infrastructure, that would provide those instances.

In conventional offerings, a customer might have an account with a physical resource provider, such as AWS, to have resource capacity provided by that physical resource provider. In alternative offerings, a customer might have an account with a virtual resource provider, such as VMware, which would manage virtual resources on behalf of the customer. In the case of VMC on AWS, however, the customer may have applications executing on virtual resources within the virtual resource environment 114, where the virtual resources are hosted on physical resources in the physical resource environment 124, where those environments are provided by different providers through different logically-isolated networks. In many instances, monitoring infrastructure and applications are essential part of the day-to-day business of a customer, such as an enterprise, where the monitoring can be critical for performance and establishing proper system management. In the situation where a customer application is running on a virtual resource offered by a first provider that is hosted on a physical resource offered by a second provider, it can be difficult to identify or debug issues with that application. In many instances, a customer may have some level of access to performance information for a provider of the virtual resource environment, and some level of access to performance information for a provider of the physical resource environment, but those providers may not share this information. In a conventional approach, a customer would have to obtain information from the separate providers and attempt to determine an environment responsible for the problem, even when the problem is detected in the other environment. In some instances, the problem might result from issues in both environments. Attempting to identify and debug these types of issues across separate environments can be costly and time-consuming, and require expertise in both environments as well as the functionality of the application being debugged.

Accordingly, approaches in accordance with various embodiments can provide customers and other users with a holistic view of their infrastructure across multiple environments, and across logical network boundaries. In at least some embodiments, users can obtain insight into performance of an offering that uses on premise resources in a customer environment, virtual resources in a virtual resource environment, and physical resources in a physical resource environment, among other such options. When there is an issue in such an offering, such as a performance problem relating to a user application executing or utilized such resources, a user can access a console, application programming interface (API), or other such mechanism for obtaining performance data and recommendations that may relate to any of the relevant environments. The user can then make adjustments or remediation for the relevant environment, or in some cases remediation can be performed automatically in the appropriate environment(s). Such an approach enables a user to debug applications that are spread across resources of multiple environments, such as VMC and native AWS, even though those environments are provided by different entities and do not otherwise provide combined information for such purposes. Using existing approaches, a user in such a situation would have limited insight into lower layers of the support stack and would need to rely upon separate support channels of the respective providers In at least one embodiment, a customer console 106 or other interface can be used to convey information to a user, where that information may include recommendations or advice relating to execution of an application or task in a managed environment. In at least one embodiment, a virtualized feature set can be provided such that various intricacies of the various environments can be exposed as consumable events. For example, it might be the case that a customer application is running slowly, where that application is hosted on virtual resources hosted on physical resources from another provider. There may be multiple causes for such slowness, as may relate to a type of throttling or a bad disk, among other potential causes. While existing approaches may provide performance data relating to hardware, such approaches are unable to correlate events in different environments.

In at least some embodiments, an environment such as a physical resource environment 124 may include a performance monitoring system 132, service, component, or module. This performance monitoring system may obtain performance information from various locations within the physical resource environment. In at least one embodiment, performance information can be obtained from log data written by various components in the environment, as may relate to physical hardware, request processing, data transmission, and the like. A performance monitoring system 132 also might be able to directly receive or obtain certain types of performance data, such as may relate to determination of a bad file or I/O error. In at least one embodiment, performance data may be obtained by a central event center 136 in the physical resource environment 124. The event center can obtain data from these various locations, as well as potentially from the virtual resource environment 114 and customer environment 102, and can determine an issue or potential problem that may require attention. In some embodiments there may be thresholds or performance metrics that are used by the event center 136 to make such determinations, such as where a latency for communications for an application fall outside an acceptable range or exceed a maximum latency threshold for the application or the associated customer account. In at least one embodiment, the event center 136 can receive (or other virtualization performance data) event data over multiple event channels or streams, which may originate from different environments.

At least some physical resource environments 124 can have various performance monitoring tools that can not only log information, but can expose at least some of that information to users. This information can also be shared with components in, or users associated with, one of the other environments. In at least one embodiment, performance information can be provided to virtual resource management software 116 in the virtual resource environment 114 so that the virtual resource management software can make appropriate adjustments in the virtual resource environment. In cases where a component such as an inference engine 132, discussed in more detail later herein, can make correlations between events in different environments and can determine a proposal or recommendation for improving performance, for example, the proposal or recommendation can also be surfaced to the customer console 106 or virtual resource management software 116 in order to enable appropriate adjustments to be made in the relevant environments, even though the correlation and inference were performed in the physical resource environment 124.

In at least one embodiment, correlations are a root cause analysis for a problem with operation of a customer application.

In one example, an event center 136 might analyze log data 134 generated by a performance monitoring component 132, which may be on individual resources in some embodiments, and determine that a disk failure occurred on a specific physical resource. In some embodiments there will be a set of agents or plugins for different components that are able to obtain and provide performance information to the performance monitoring component. The event center 136 can then utilize an API, plug-in, or other such mechanism to request, or obtain, related information from the virtual resource environment 114, such as from the virtual resource management software 116 (e.g., vCenter Management). In some embodiments the virtual resource environment 114 may not allow for querying, but may publish event data on an event stream. The event center 136 can receive and analyze this event stream, and can determine that an application executing on a virtual machine associated with the disk failure, is having performance issues. The event center 136 can, in at least one embodiment, feed the event data from the various environments to an inference engine 132, which can analyze the input data and infer a correlation in some embodiments, or a remediation in other embodiments. In some embodiments an inference engine may be able to provide both. An example inference engine can include a deep neural network, or other machine learning, trained using event data from the various environments. Such a network can then infer a correlation between events, and potentially infer a recommendation or remediation for the correlation. The remediation may involve an action in one or more of the customer environment 102, virtual resource environment 114, or physical resource environment 124. In at least one embodiment, recommendations may be sent to the virtual resource management software 116, which can publish messages, alarms, notifications, or other such data to the customer. An advantage to publishing through the virtual resource management software 110 is that a customer only needs to log into a single account or console for a single provider, and does not always need to login to resources in both the virtual and physical resource environments. In one example, one such notification might state that it was noticed that an application is running slowly and that there has been a disk failure, so the customer may want to request or modify a resource associated with the application. In some embodiments, this may be performed automatically, where permitted, by a component such as the virtual resource management software 110 or resource manager 138 in the appropriate environment.

A neural network used with the inference engine can then be trained to correlate events that occur in these different environments. Many events in different environments can be correlated, and will often have a limited number of potential causes. In some embodiments all incoming event data can be passed to the inference engine to attempt to infer issues in one or more of the environments. In other embodiments, detection by the event center 136 of a potential issue can have any related event data passed to the inference engine, or can have all event data from the various environments passed as input for a period of time in order to attempt to infer one or more correlations that may be associated with the potential issue. In some embodiments the correlation will be sufficient, as certain types of events will have certain causes and the inference will be sufficient to provide notification. As mentioned, however, in some embodiments a second neural network can be used to take the correlations and input and infer an appropriate remediation to take or suggest to the customer or provider of the virtual resource environment 114.

In some embodiments the information surfaced to a customer will relate to the issue detected, such as a bad disk or presence of throttling of a certain type of resource or communication. In some embodiments one or more recommendations of remediation actions can be provided. This may include, for example, a recommendation to adjust a throttling value or move to a different virtual instance type, etc. In yet other embodiments, some of these actions may be taken automatically within the relevant environment, at least for certain types of remediation, where certain other types may at least require prior customer authorization. In some embodiments an interface might ask the customer whether they want to be notified of these types of events, as well as whether the system should auto-remediate for these types of events.

Figure 2:
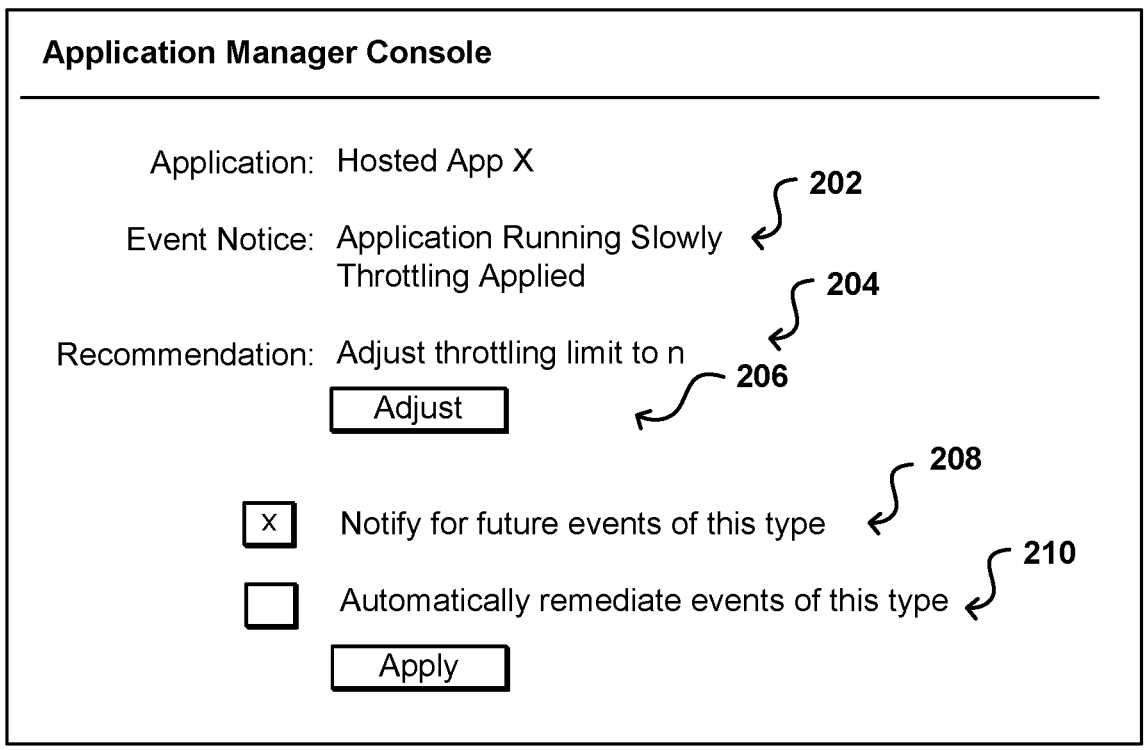
FIG. 2 illustrates an example interface that can be generated in accordance with various embodiments.

FIG. 2 illustrates an example interface 200 that can be provided to a customer, or other user, in accordance with various embodiments. As mentioned, in various embodiments this can be an interface provided by the virtual resource environment, but can incorporate information determined by the physical resource environment. In other embodiments, this interface can be provided by the physical resource environment, but can incorporate information obtained from the virtual resource environment. Such an interface enables a user to obtain information about an application that is executing on virtual resources in the virtual resource environment running on physical resources of the physical resource environment. Conventional tools do not provide such visibility, particularly for virtual resource environments such as VMC that are managed services. VMC creates a new layer of infrastructure on top of the physical infrastructure layer, adding an additional layer of complexity that sits across an environment boundary. An application advisor tool as discussed herein can monitor any or all of these layers in the stack, even though an environment associated with the tool may only have full control over a subset of those layers. Further, the different environments will have different types of communications and architectures. A tool as disclosed herein can take information from these different environments, correlate that information, and provide recommendations and remediation actions for the various environments. Such a tool can also correlate workflows across these different environment or ecosystem boundaries.

As illustrated in FIG. 2, an example interface 200 can provide information for a specified application executing or hosted in a corresponding environment. The interface can provide notifications 202 of events that were detected in any of the monitored environments, including a customer environment or a resource environment. Information from different environments may have come from different sources. In this example, an application advisor service can have correlated these events, along with other relevant information, and determined a recommendation to improve performance or solve a problem. In this example, a recommendation 204 is provided that the user should adjust the current throttling level since the application is running slowly and this has been determined to be correlated to the throttling. The interface in this example also provides an option 206 for the user to instruct or approve of the throttling adjustment, such that the recommended change can be made quickly and directly through the console. In this example, the interface also provides an option 208 that enables the user to indicate whether the user want to be notified of events of this type.

Another option 210 enables the user to indicate whether the user wants these types of adjustments to be applied automatically in the future. Various other options and types of information can be provided as well. Further, the information can be surfaced through other mechanisms as well, such as through an API or messaging service, among other such options. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In various embodiments, a customer may have multiple accounts with one or more of the resource providers. For example, a customer might have a master account with a physical resource provider, and may have multiple sub-accounts for specific applications or users. A monitoring service along the customer data path for any of these accounts can obtain related performance data. Similarly, the customer might have a master accounts and various sub-accounts with the virtual resource provider, and event data can be obtained on an event stream from the virtual resource environment. An advantage of approaches in accordance with various embodiments is that a customer can obtain performance, event, and recommendation information across all of these accounts with only having to log in to one of the master accounts. As mentioned, the correlations and recommendations can be determined using various types of machine learning, algorithms, and monitoring tools in one of the environments that can be based on data from all of the environments. As mentioned, the recommendations can include recommendations in any of the environments, such as to adjust a virtual resource allocation in a virtual resource environment or to move a virtual resource to be hosted on a different physical resource in a physical resource environment. In some embodiments, a remediation in one environment can be triggered by a component in another environment. For example, a recommendation service in a physical resource environment could provide an instruction, or recommendation, to a virtual resource manager in a virtual resource environment that a workload should be moved to a different type or virtual resource, and the virtual resource manager may automatically act on the recommendation in the virtual resource environment.

In some embodiments, recommendations may be made not only for detected issues or problems, but also to optimize performance. An inference engine can also be trained to determine types of events that are related to less than optimal performance. The inference can then be analyzed using business logic and best practices to determine recommendations for improving performance, even though the application is running within acceptable performance parameters at the current time. A customer can choose to receive these recommendations or have them automatically applied in at least some embodiments. In some instances where a recommendation comes from a first environment but relates to a second environment, the customer may have to request or make the change in the second environment if otherwise unable to be automatically applied.

In another example, a customer might run an application in a virtual resource environment. Prior tasks for that application may have taken amount 120 ms, but are not taking around 500 ms. From a point of view of the customer, the customer may only have access to the virtual resource environment. An application advisor tool in the physical resource environment can have obtained event information from the virtual resource environment and correlated this with performance data and events in the physical resource environment. These correlations and any recommendations can then be surfaced to the customer when the customer accesses a console to determine a status of their application. The customer can then view the commendation, such as to make a hardware or configuration change, and can cause the change to be executed. This can all be done with the customer being unaware of the physical resource environment being used or impacting performance in at least some embodiments.

Figure 3:
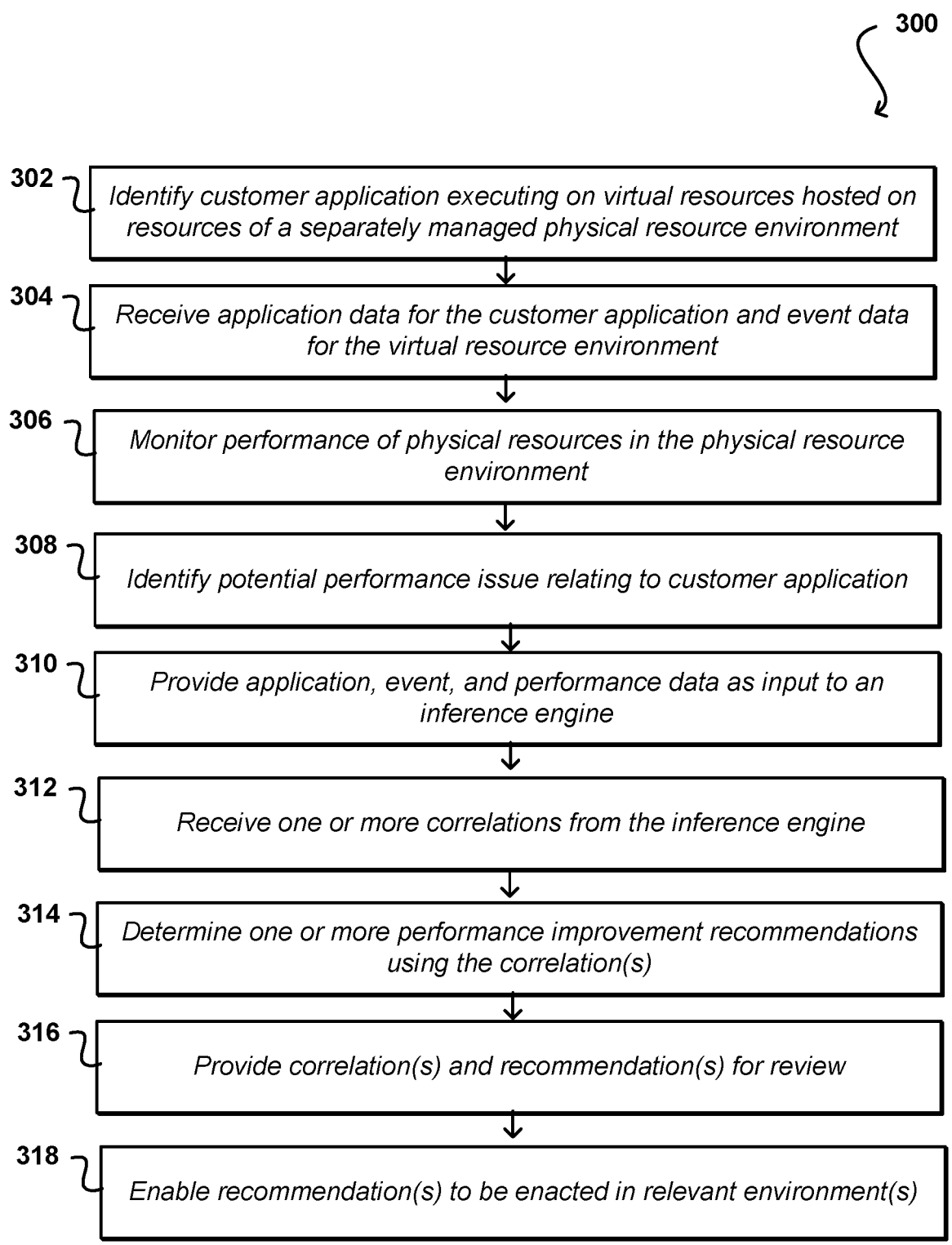
FIG. 3 illustrates a process for correlating application information across environment boundaries that can be utilized in accordance with various embodiments.

FIG. 3 illustrates an example process 300 for recommending adjustments to an application utilizing resources in multiple environments. It should be understood that there can be additional, fewer, or alternative steps performed in similar or alternative orders, or in parallel, within the scope of the various embodiments unless otherwise specifically stated. In this example, a customer application executing using virtual resources in a virtual resource environment is identified 302, where at least a subset of those virtual resources are hosted using physical resources of a physical resource environment, the physical resource environment being managed by a different entity than the virtual resource environment. In some embodiments these environments can correspond to different layers in a resource stack, and information may not be available across different layers. Event data related to the customer application can be received 304 over an event stream from the virtual resource environment. In at least some embodiments, application data can also be received from a customer environment relating to performance of the customer application, as discussed in more detail elsewhere herein. In at least one embodiment there is a performance monitor for the customer application itself that can detect potential performance issues with respect to the application. In this example, the customer application is an application with which a customer interacts, and is not part of the resource infrastructure. Performance of physical resources in the physical resource environment is also concurrently monitored 306. During execution of the application, a potential performance issue can be identified 308, such as the performance being sub-optimal. The issue can be related to any aspect of the customer application, but may relate to an issue anywhere in the execution stack, such as in a customer, virtual resource, or physical resource environment or layer (or combination thereof). The event data and performance data can be provided 310, as well as potentially any available application data, as input to an inference engine trained to correlate types of events in various environments. In response, one or more correlations can be received 312 from the inference engine. One or more recommendations for improving performance can then be determined 314 based on the correlations, such as by using various algorithms or analytical tools. Information about the events, as well as any recommendations, can be provided 316 to a customer or user associated with the application. In this example the customer is then enabled 318 to enact the recommendation(s) in the appropriate environment(s), although in some embodiments at least some of these recommendations are able to be enacted automatically by a component or service in the relevant environment.

In the case of VMC on AWS, such an application advisor offering can provide a single pane of view for customers for monitoring applications that stretch over the boundaries of both VMC and AWS. Such a tool can collect metrics from both VMware and AWS and provide a uniform view of an application, enabling the application owners to detect and troubleshoot their application problems, reducing their mean time to resolution and improving Service-Level Agreements (SLA). Machine learning techniques can be utilized to detect and correlate anomalies in telemetry, events and activities, to surface actionable problems across the application stack, and can help application owners to quickly find root-cause of these problems. For VMC customers, an application advisor in AWS can automate a process of recommending best practices for customers running their applications. Such a tool can integrate with a VMware offering such as the vRealize suite for customers to manage their application across the boundaries of VMC and AWS. As mentioned, there may be situations where a customer application talks to virtual resources in a virtual resource environment, but also communicates directly with resources in a physical resource environment, such as to store data to a managed storage service offered in the physical resource environment. An application advisor as discussed herein can detect and troubleshoot issues relating to the application that occur in any of these environments, even where the issue may relate to communication or interactions that do not directly touch a particular environment. For example, a problem with this managed data service in the physical resource environment might cause performance issues for the customer application that are completely separate from resources of the virtual resource environment.

Figure 4:
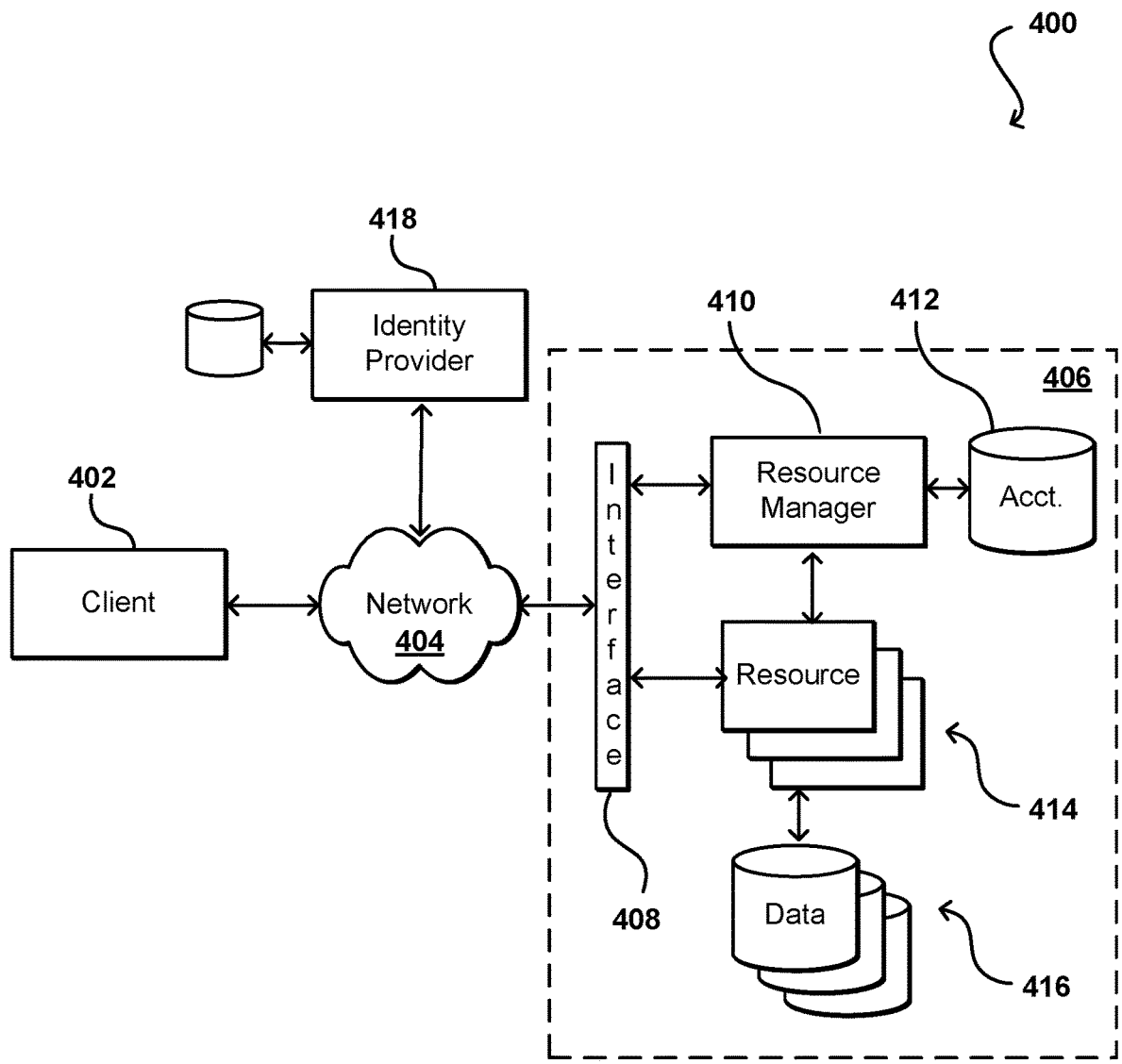
FIG. 4 illustrates an example physical resource environment that can be utilized in accordance with various embodiments.

FIG. 4 illustrates an example physical resource environment 400 in which aspects of the various embodiments can be implemented. In this example a user is able to utilize a client device 402 to submit requests across at least one network 404 to a resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 418, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 406 and/or to the client device 402, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
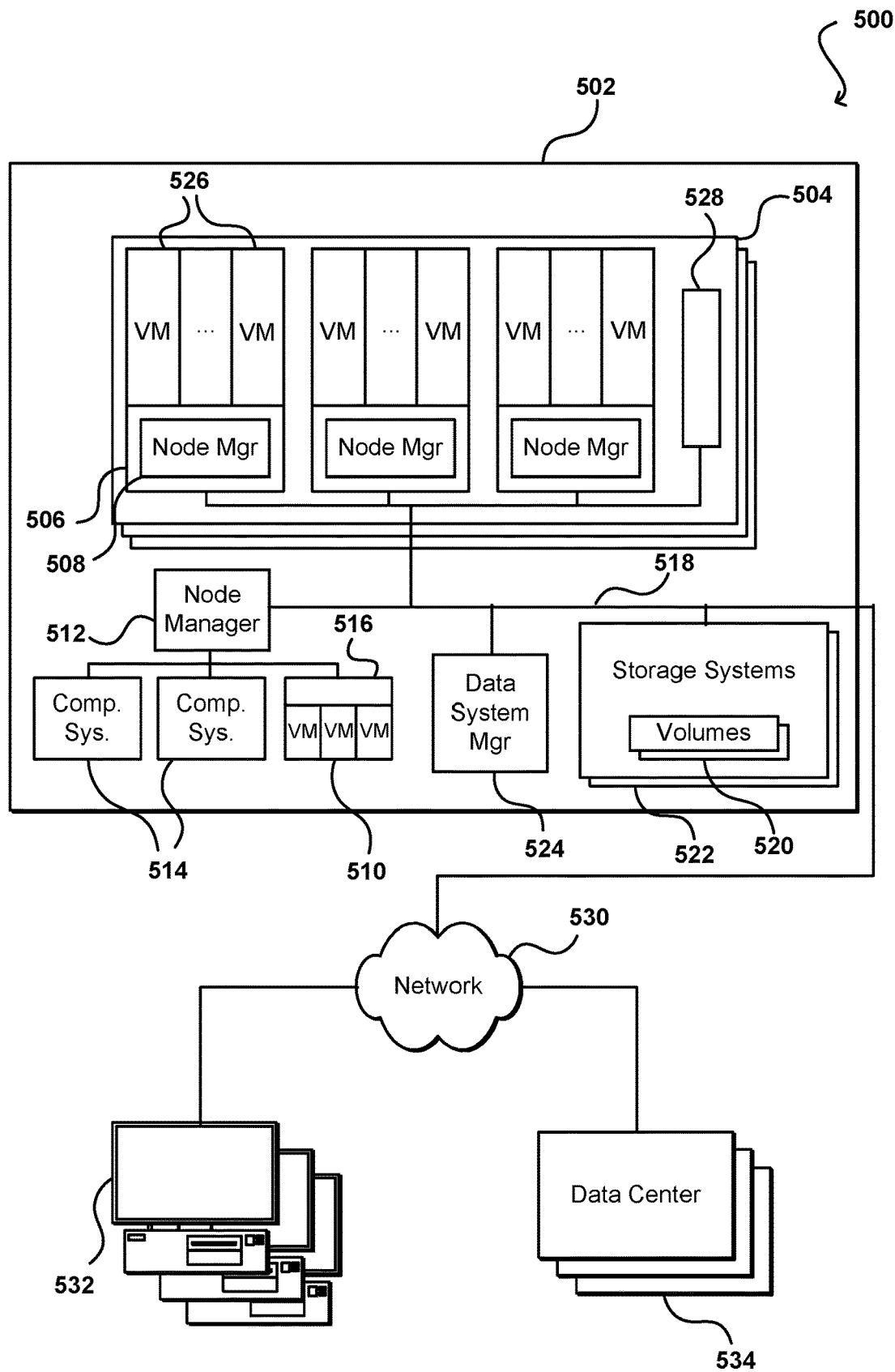
FIG. 5 illustrates components of an example data center that can be utilized in accordance with various embodiments.

FIG. 5 illustrates an example network configuration 500 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 502 includes a number of racks 504, each rack including a number of host computing devices 506, as well as an optional rack support computing system 528 in this example embodiment. The host computing systems 506 on the illustrated rack 504 each host one or more virtual machines 526 in this example, as well as a distinct node manager module 512 associated with the virtual machines on that host computing system to manage those virtual machines. One or more other host computing systems 516 may also each host one or more virtual machines 510 in this example. Each virtual machine 510 may act as an independent resource node for executing one or more program copies or performing another such action or process for user data requests, I/O operations, etc. In addition, this example data center 502 further includes additional host computing systems 514 that do not include distinct virtual machines, but may nonetheless each act as a resource node for one or more tasks being executed for a user. In this example, a node manager module 512 executing on a computing system (not shown) distinct from the host computing systems 514 and 516 is associated with those host computing systems to manage the resource nodes provided by those host computing systems, such as in a manner similar to the node manager modules 508 for the host computing systems 506. The rack support computing system 528 may provide various utility services for other computing systems local to its rack 504 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 502 also includes a computing system 524 that executes a data storage system manager module for the block-based data storage service to assist in managing the availability of non-local block-based data storage to programs executing on resource nodes provided by the host computing systems located within the data center (or optionally on computing systems located in one or more other data centers 534, or other remote computing systems 532 external to the data center). In particular, in this example the data center 502 includes a pool of multiple block-based data storage systems 522, which each have local block-based storage for use in storing one or more volume copies 520. Access to the volume copies 520 is provided over the internal network(s) 518 to programs executing on various resource nodes 510 and 514. As discussed in greater detail elsewhere, a block-based data storage system manager module 524 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 522 may coordinate with the node manager modules 512, 508 to manage use of volumes by programs executing on associated resource nodes, while in other embodiments the node manager modules may not be used to manage such volume use. In addition, in other embodiments, one or more system manager modules 524 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 522 (e.g., in a peer-to-peer manner, without any separate centralized system manager module on a computing system 524).

In this example, the various host computing systems, server block data storage systems, and computing systems are interconnected via one or more internal networks 518 of the data center, which may include various networking devices (e.g., routers, switches, gateways, etc.) that are not shown. In addition, the internal networks 518 are connected to an external network 530 (e.g., the Internet or another public data network) in this example, and the data center 502 may further include one or more optional devices (not shown) at the interconnect between the data center and an external network (e.g., network proxies, load balancers, network address translation devices, etc.). In this example, the data center 502 is connected via the external network 530 to one or more other data centers 534 that each may include some or all of the computing systems and storage systems illustrated with respect to data center 502, as well as other remote computing systems 532 external to the data center. The other computing systems 532 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 5 has been simplified for the purposes of explanation, and that the number and organization of host computing systems, server block data storage systems and other devices may be much larger than what is depicted in FIG. 5. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 5 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 5, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "Attach Volume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "Detatch Volume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Figure 6:
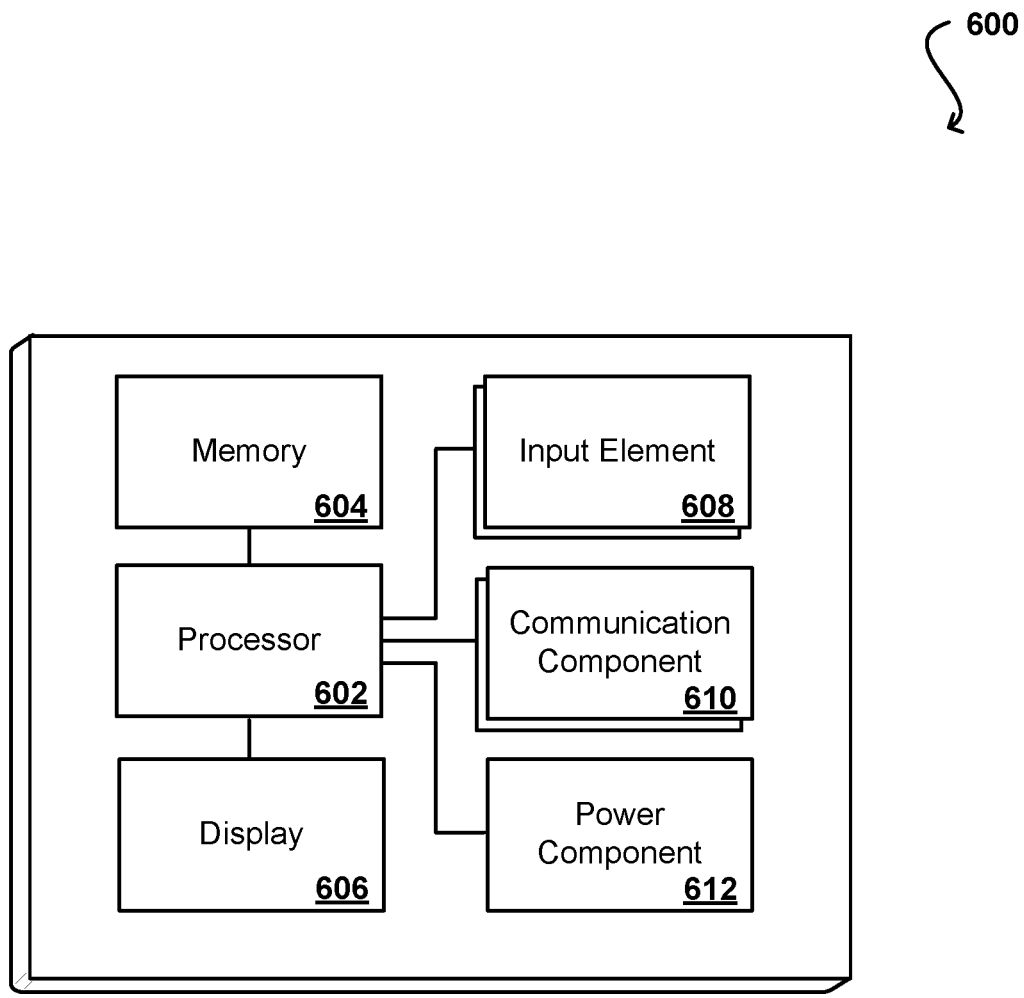
FIG. 6 illustrates components of an example computing device that can be used to perform aspects of the various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface or communication elements or components 610 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 612, such as power cords, power ports, batteries, wirelessly powered or rechargeable receivers, and the like.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    executing a customer application, by a customer, on virtual resources of a virtual resource environment that is managed by a first entity that is different than the customer and that is hosted on physical resources of a cloud provider environment managed by a second entity that is different than the customer and the first entity, and wherein communication of performance data is prevented between the second entity and the first entity;
    obtaining application performance data relating to performance of the customer application in a customer environment;
    obtaining virtualization performance data in the cloud provider environment relating to performance of a subset of the virtual resource environment used to implement the customer application;
    obtaining physical resource performance data for a subset of the physical resources used to implement the customer application;
    inferring one or more correlations based on the application performance data, the virtualization performance data, and the physical resource performance data, wherein the one or more correlations are used in a root cause analysis for a problem with operation of the customer application;
    determining, based at least in part upon the one or more correlations, a remediation to the problem, the remediation to be performed in the customer environment, the virtual resource environment, or the cloud provider environment; and
    performing the remediation for the customer application.

2. The computer-implemented method of claim 1, further comprising:
    providing, for presentation to the entity, information regarding at least one of the application performance data, the virtualization performance data, the physical resource performance data, or the one or more correlations for concurrent display through a single interface.

3. The computer-implemented method of claim 1, further comprising:
    providing an option to cause the remediation to be performed.

4. The computer-implemented method of claim 1, wherein the virtual resource environment is a VMware Cloud (VMC) managed resource environment, and wherein the cloud provider environment is an Amazon Web Services (AWS) environment.

5. A computer-implemented method, comprising:
    executing, by a customer, an application in virtual resources in a first environment that is managed by a first entity that is different than the customer;
    receiving virtualization performance data for the virtual resources;
    obtaining physical resource performance data for physical resources that are in a second environment and that host at least a subset of the virtual resources, the second environment managed by a second entity that is different than the customer and the first entity, and wherein communication of performance data is prevented between the second entity and the first entity;
    determining one or more correlations between the virtualization performance data and the physical resource performance data;
    and
    performing a remediation to a problem associated with performance of the application, the problem determined by a root cause analysis on the one or more correlations.

6. The computer-implemented method of claim 5, further comprising:
    determining the remediation to also improve the performance of the application, the remediation to be performed the first environment or the second environment; and
    providing, for display, a recommendation to perform the remediation.

7. The computer-implemented method of claim 6, further comprising:
    providing an option to cause the remediation to be performed automatically.

8. The computer-implemented method of claim 6, further comprising:
determining the one or more correlations using a neural network that is trained to determine correlations between events across environment boundaries.

9. The computer-implemented method of claim 6, further comprising:
causing the remediation to be performed in a customer environment, in the first environment, or in the second environment using application performance information for the application, the application performance information comprising the one or more correlations and that is provided to the customer environment.

10. The computer-implemented method of claim 6, further comprising:
causing specified types of the remediation to be performed automatically in at least one of the first environment or the second environment.

11. The computer-implemented method of claim 6, wherein at least further resources that are used to execute the application are located in a customer environment, and wherein the virtualization performance data is further able to be received from the customer environment.

12. The computer-implemented method of claim 6, further comprising:
providing a single interface wherein an entity associated with the application can request performance adjustments to be performed in the first environment and the second environment.

13. The computer-implemented method of claim 6, wherein a service in the second environment is configured to send the application performance information to a customer console manager in the first environment for display to the customer of the first environment.

14. A system, comprising:
at least one processor; and
memory including instructions that, upon being executed by the at least one processor, cause the system to:
executing, by a customer, an application in virtual resources in a first environment that is managed by a first entity that is different than the customer;
receive virtualization performance data for virtual resources;
obtain physical resource performance data for physical resources that are in a second environment and that host at least a subset of the virtual resources, the second environment managed by a second entity that is different than the customer and the first entity, and wherein communication of performance data is prevented between the second entity and the first entity;
determine one or more correlations between the virtualization performance data and the physical resource performance data;
and
perform a remediation to a problem associated with performance of the application, the problem determined by a root cause analysis on the one or more correlations.

15. The system of claim 14, wherein the instructions when executed further cause the system to:
determine the remediation to also improve the performance of the application, the remediation to be performed in at least one of the first environment or the second environment.

16. The system of claim 14, wherein the instructions when executed further cause the system to:
provide an option to cause the remediation to be performed automatically.

17. The system of claim 14, wherein the instructions when executed further cause the system to:
determine the one or more correlations using a neural network that is trained to determine correlations between events across environment boundaries.

18. The system of claim 14, wherein the instructions when executed further cause the system to:
causing the remediation to be performed in a customer environment, in the first environment, or in the second environment using application performance information for the application, the application performance information comprising the one or more correlations and that is provided to the customer environment.

19. The system of claim 14, wherein the instructions when executed further cause the system to:
cause specified types of the remediation to be performed automatically in at least one of the first environment or the second environment.

20. The system of claim 14, wherein the instructions when executed further cause the system to:
provide a single interface wherein an entity associated with the application can request performance adjustments to be performed in the first environment and the second environment.

* * * * *